(12) United States Patent
Hausgen

(10) Patent No.: US 6,433,268 B1
(45) Date of Patent: Aug. 13, 2002

(54) INTERIOR THERMAL RADIATION CONTROL FOR ALKALI METAL THERMAL TO ELECTRIC CONVERSION

(75) Inventor: Paul E. Hausgen, Albuquerque, NM (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 54 days.

(21) Appl. No.: 09/681,190

(22) Filed: Feb. 15, 2001

(51) Int. Cl.[7] .............................................. H01L 35/30
(52) U.S. Cl. ...................................................... 136/205
(58) Field of Search ........................................ 136/205

(56) References Cited

U.S. PATENT DOCUMENTS 5,929,371 A * 7/1999 Svedberg et al. ............ 136/204

* cited by examiner

Primary Examiner—Bruce F. Bell
Assistant Examiner—Thomas H. Parsons
(74) Attorney, Agent, or Firm—James M. Skorich; Kenneth E. Callahan

(57) ABSTRACT

An AMTEC cell is improved by using a grooved wall of high specularity in the low-pressure zone. The cell's parasitic heat transfer is reduced by reflecting radiant energy back toward the high-temperature end of the cell and by increasing the wall heat conduction path. Efficiency is improved by both increasing the temperature of the BASE structure and by reducing the parasitic heat transfer. A heat shield of similar construction located within the low-temperature zone is also disclosed.

4 Claims, 5 Drawing Sheets

INTERIOR THERMAL RADIATION CONTROL FOR ALKALI METAL THERMAL TO ELECTRIC CONVERSION

STATEMENT REGARDING FEDERALLY SPONSORED RESEARCH OR DEVELOPMENT

[The conditions under which this invention was made are such as to entitle the Government of the United States under paragraph I(a) of Executive Order 10096, as represented by the Secretary of the Air Force, to the entire right, title and interest therein, including foreign rights.]

BACKGROUND OF THE INVENTION

1. Field of the Invention

This invention is in the field of alkali metal thermal to electric conversion (AMTEC), and in particular relates to the reduction of parasitic heat transfer within AMTEC devices.

2. Description of the Related Art

AMTEC devices consist of a high-pressure, high-temperature zone (900 to 1200 K) and a low-pressure, low-temperature (500 to 650 K) zone separated by a solid electrolyte structure that permits ions but not electrons of an alkali metal working fluid to migrate from the high to the low-pressure zone. Sodium is commonly used as the working fluid. β alumina normally functions as the separating electrolytic structure and is commonly referred to as the β alumina solid electrolyte (BASE). The BASE, a ceramic material, is an excellent sodium ion conductor and a poor electronic conductor.

The injection of thermal energy into the high-temperature zone and the rejection of thermal energy from the low-temperature zone create the pressure differential across the BASE. The pressure differential provides the energy needed to overcome the ionization energy of the sodium atoms, thereby creating positively charged sodium ions. The sodium ions readily pass through the BASE wall leaving an accumulation of electrons at the high-pressure interface. The negative and positive charge buildup at opposing interfaces creates an electrical potential across the BASE. This electrical potential can be used to drive an electrical load, i.e., the free electrons pass from the high pressure electrode (anode), through an electrical load, and back to the low pressure electrode (cathode) where they recombine with the sodium ions emerging from the BASE surface. The neutralized sodium atoms migrate in a vapor state through the low-pressure zone, condense on the cooled inner surface of the chamber, and return to the high-pressure zone via a capillary structure.

Inherent in the AMTEC cycle is the transfer of energy from the heat-input zone of the device to the heat-rejection zone through the evaporation, flow, and condensation of the alkali metal working fluid. This energy transfer through the exchange of latent heat is required for continuous operation of the AMTEC cycle. However, due to the presence of a temperature differential between the heat-input zone (high-temperature) and the heat-rejection zone (low-temperature), unwanted energy transfer occurs that is not inherent to the AMTEC energy conversion cycle. This unwanted, parasitic energy transfer reduces the thermal efficiency of the device. The energy transfer modes by which this parasitic energy transfer occurs include conductive and radiative heat transfer. While this parasitic heat transfer can not be completely eradicated, it can be minimized. A by-product of decreasing the parasitic heat transfer sometimes involves an increase in BASE temperature and sodium evaporation temperature. This is very fortuitous because increasing these parameters contributes to increased electrical power output.

Previous approaches to reducing this parasitic heat transfer have included positioning locally flat surface heat shields between the heat-input end (high-temperature) of the cell and the heat-rejection end (low-temperature) of the cell, reducing interior surface absorptivity and emissivity, and decreasing the cross sectional area of the enclosure wall that connects the high-temperature end to the low-temperature end. U.S. Pat. No. 5,929,371 employs a variety of cylindrical heat shield embodiments in the low-pressure zone that are intended to reduce the parasitic radiative heat transfer. These shields are effective in reducing the parasitic heat transfer, but they obstruct the sodium flow through the low-pressure cavity, which is a disadvantage. Obstruction of the sodium flow leads to a decrease in the pressure differential across the BASE, which reduces the power output of the cell. If properly designed, however, the reduction in parasitic heat transfer is sufficient to overcome the decreased power output resulting in a net increase in thermal conversion efficiency. The types of heat shields presented in the '371 patent do not attempt to employ local directional control of thermal radiation nor do they directly claim to reduce the parasitic wall conduction. Independent analysis, however, has shown that the type of heat shields shown in FIG. 2 of the '371 patent can actually cause an increase in the parasitic radiative heat transfer while decreasing the parasitic conductive heat transfer for an adiabatic external wall boundary.

It is the object of the present invention to reduce both the conductive and radiative parasitic heat transfer of AMTEC devices with cell modifications that minimally obstruct the flow of sodium from the high-temperature zone to the low-temperature zone, thereby increasing the thermal conversion efficiency.

SUMMARY OF INVENTION

The present invention consists of geometrically designed specular surfaces (grooves) within the low-pressure cavity of the AMTEC enclosure designed to reflect a significant amount of thermal radiation back to its source, the high-temperature BASE region. The result of this redirection of thermal radiation is a decrease in the parasitic heat transfer to the low-temperature end of the enclosure and an increase in the BASE temperature. Both of these effects cause an increase in thermal efficiency. In one exemplary embodiment of this invention, the geometrically designed surfaces are parallel, asymmetric wall grooves in a cylindrical AMTEC cell. Another embodiment involves an interior asymmetrically grooved cylindrical wall heat shield.

BRIEF DESCRIPTION OF DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION

Typically, the means of reducing parasitic heat transfer in an AMTEC device have involved placing heat shields between the high-temperature end of the cell and the low-temperature end. While this method has been effective, it focuses on simply blocking the AMTEC interior radiation heat transfer and tends to restrict the flow of the alkali metal working fluid. In contrast, the present invention controls the thermal radiation heat transfer by using specular reflection in combination with specially designed geometric surfaces (i.e., grooves) strategically placed in the low-pressure area of the AMTEC device. The shape of the surfaces and their degree of specularity (the higher the better) play a significant role in determining their effectiveness.

It is known that grooves increase the effective absorptivity of a surface. Intuitively, one might expect that an increase in effective absorptivity of surfaces in the low-pressure region of the AMTEC device would increase the parasitic heat transfer. However, this is not the case for the present invention. Careful groove/cavity design combined with high specularity results in an effective surface reflectivity that causes a significant fraction of the thermal radiation incident on the grooved surface from the high-temperature zone to be re-directed back to its source. This significant re-direction of radiation back toward the high-temperature zone overcomes the adverse effect of the higher effective wall absorptivity.

Figure 1:
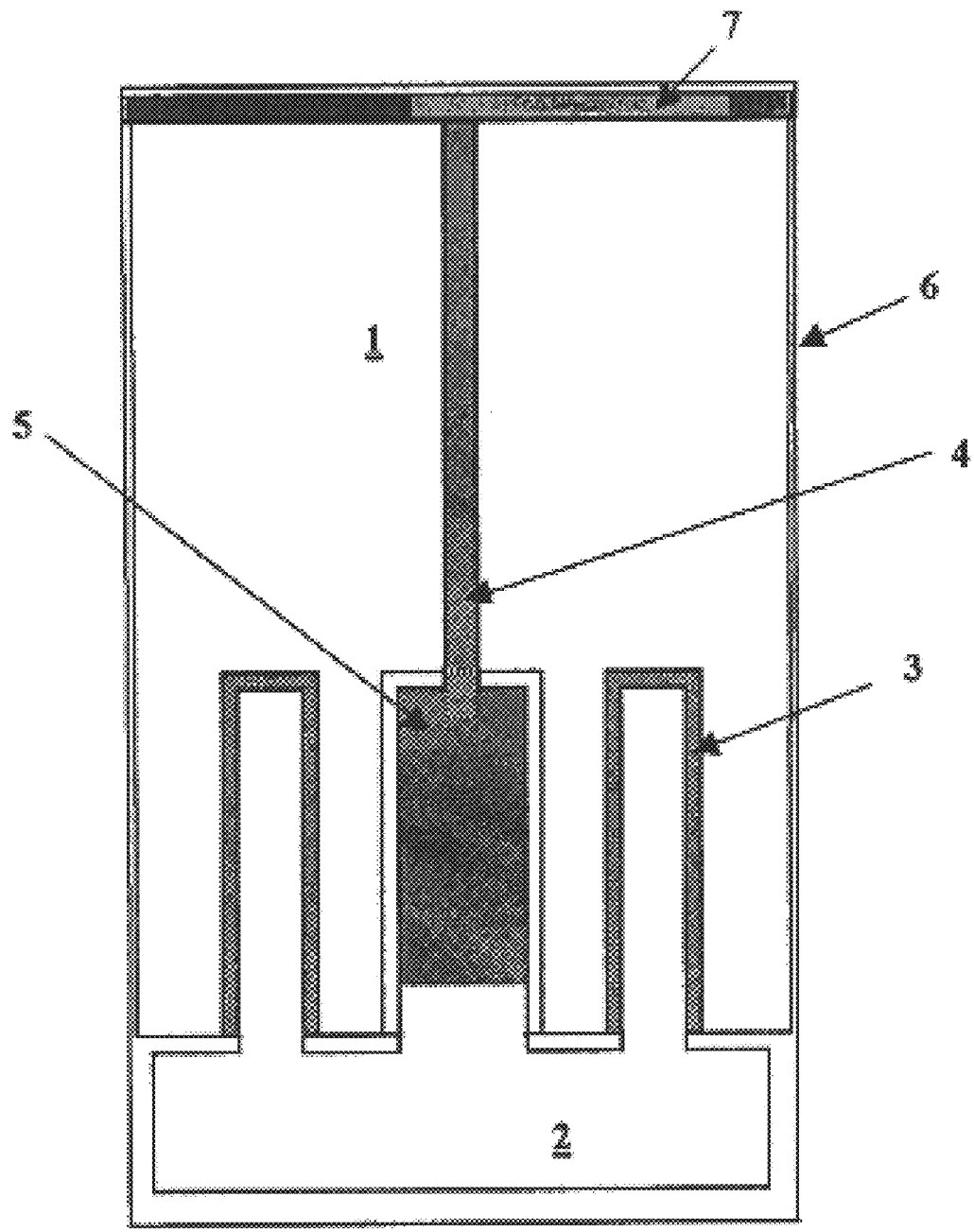
FIG. 1 is a cross-sectional view of a typical AMTEC cell.

A typical AMTEC cell is shown in FIG. 1 (U.S. Pat. No. 5,929,371). The basic elements of the cell are: a low pressure sodium vapor cavity 1; a high pressure sodium vapor cavity 2; BASE tubes with electrodes and current collectors 3 separating the two cavities; a sodium return artery 4; an evaporator 5; a (cylindrical) wall enclosing the low-pressure cavity 6; and a condenser 7 at the heat rejection end (top of the low-pressure cavity opposite the high temperature BASE tubes.

Figure 2:
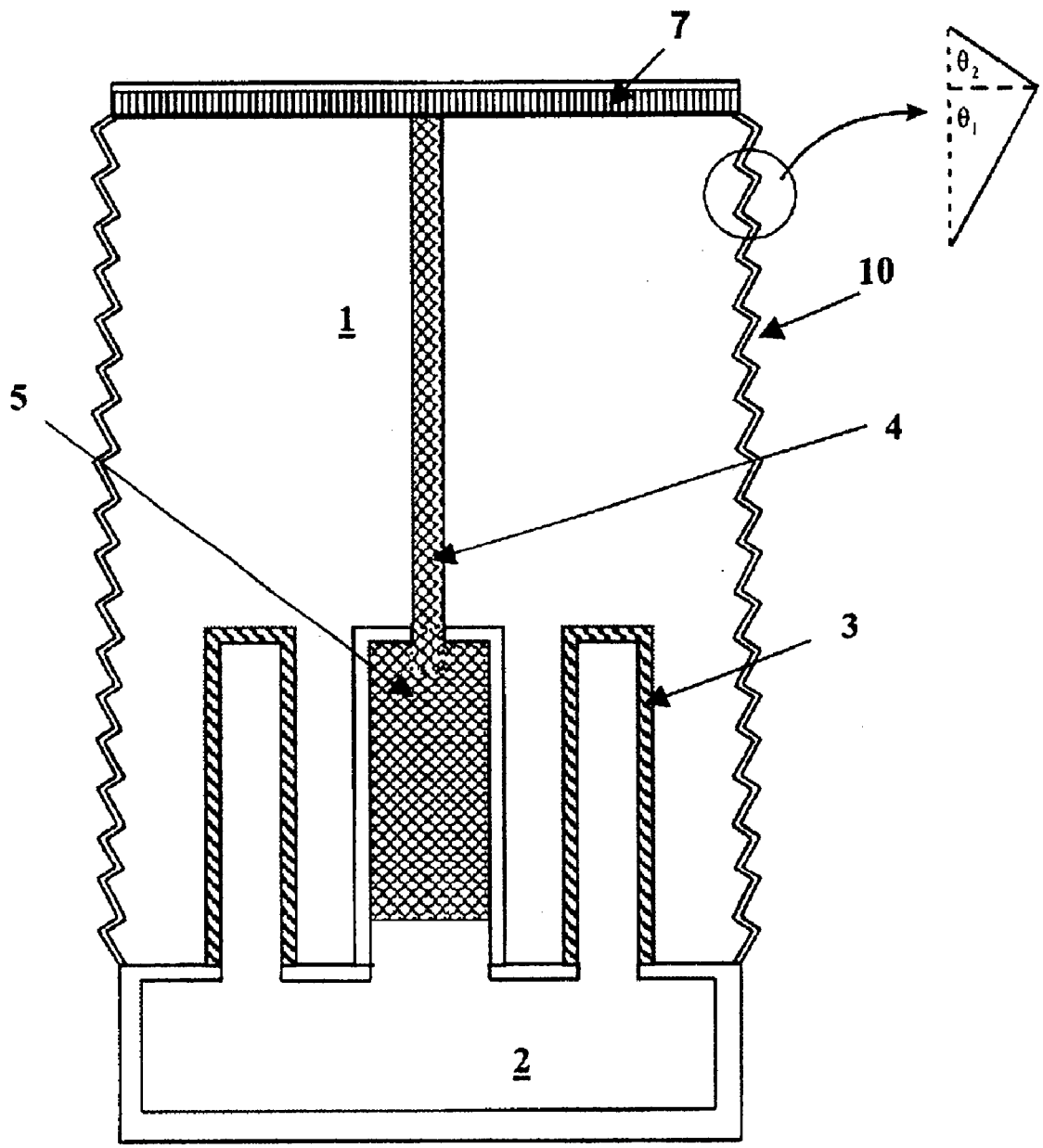
FIG. 2 is a cross-sectional view of an AMTEC cell with the asymmetric grooved cylinder walls of the present invention.

The first preferred embodiment of this invention, referenced to a cylindrically-shaped AMTEC cell, involves parallel, asymmetric grooves 10 in the cylindrical wall portion of the low-pressure zone enclosure (see FIG. 2). The grooved profile is present on both the interior and exterior sides of the cylindrical wall. Grooving the exterior in addition to the interior improves device performance by increasing the cylindrical wall heat conduction path from the heat-input zone to the heat-rejection zone. The increase in conduction path coupled with the directional control of interior thermal radiation yields an increase in the thermal efficiency of the device.

Theoretical analysis has shown that with proper groove opening angles ($\theta_1$ and $\theta_2$ of FIG. 2) and proper surface specularity, this groove design can increase the thermal efficiency of an AMTEC cell by two mechanisms. First, the power output is increased because the re-directed radiant energy increases the BASE temperature. Secondly, the parasitic heat transfer to the heat-rejection end of the device is reduced in both the conductive and radiative heat transfer mechanisms.

Figure 3:
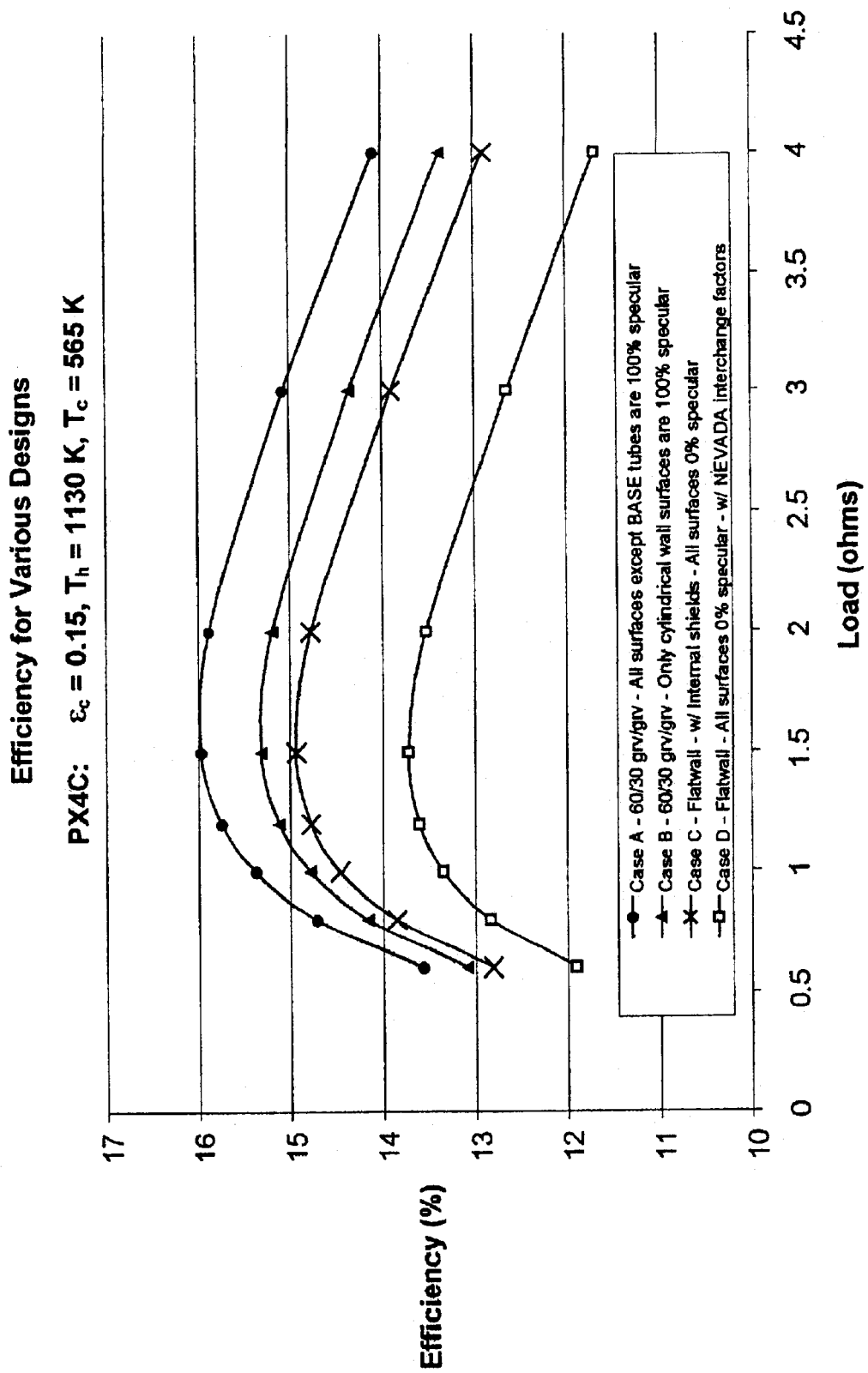
FIG. 3 is a plot comparing the efficiency of an AMTEC cell using the present invention vs. other AMTEC cell designs.

FIG. 3 shows the increase in thermal efficiency for a typical AMTEC cylindrical design with twenty 60°/30° ($\theta_1/\theta_2$) parallel asymmetric wall grooves and no interior heat shields. The $\theta_2$ surface opens toward the heat-rejection zone of the cell and the $\theta_1$ surface opens toward the heat-input zone. The wall is assumed to be adiabatic. For CASE A, the low-pressure cavity of the AMTEC cell has the asymmetric wall grooves with $\theta_1=60°$ and $\theta_2=30°$. In addition, all interior surfaces are 100% specularly reflecting except for the BASE tubes. For CASE B, the AMTEC device has the same asymmetric wall grooves, but only the groove surfaces are 100% specularly reflecting; all other surfaces are diffuse. For CASE C, the device corresponds to the '371 patent with interior heat shields, smooth walls, and diffuse surfaces (FIG. 2 in '371). In CASE D, the AMTEC cell is similar to CASE C but has no interior heat shields. It is apparent from FIG. 3 that a higher efficiency is attained in the embodiments of CASES A and B of the present invention compared to the '371 heat shield (CASE C) or the unshielded cell (CASE D).

The ability of the asymmetric wall groove to redirect thermal radiation originating from the heat-input zone of the AMTEC back toward the heat-input zone is closely related to the wall groove opening angles. For an asymmetric groove ($\theta_1/30°$) with the 30° surface in opposition to the heat input zone and the $\theta_1$ surface in opposition to the heat rejection zone, theoretical modeling has shown that $\theta_1=60°$ yields more reflected energy in the direction of the heat input region than $\theta_1=30°$, 35°, 45°, 75° and 80°.

Figure 4:
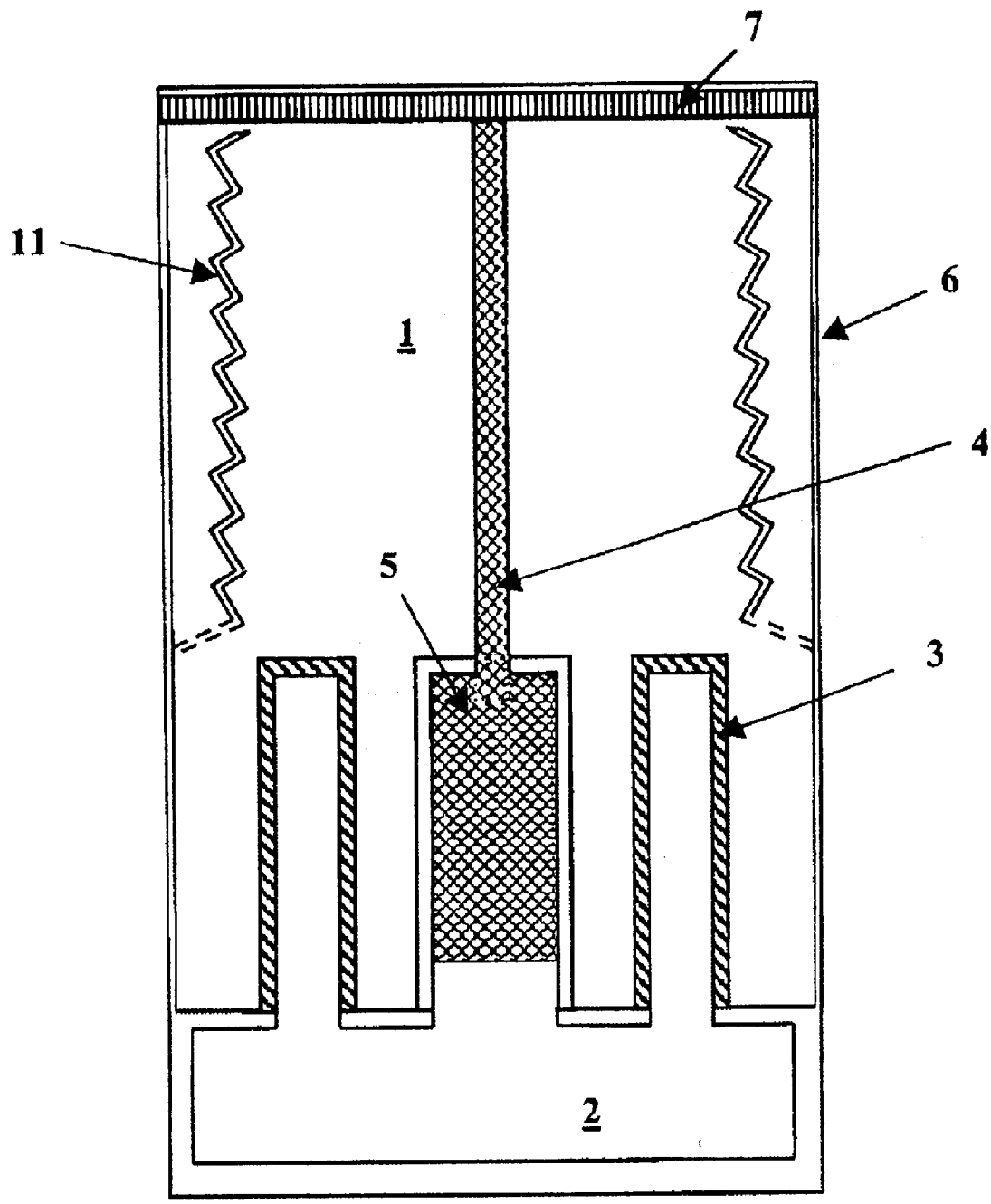
FIG. 4 is a cross-sectional view of an AMTEC cell with in internal grooved shield.

A second embodiment of this invention is shown in FIG. 4. In this example, an interior heat shield 11 employing the asymmetric groove profile and paralleling the exterior cylindrical wall 6 of the low-pressure cavity 1 is used. Theoretical analysis has shown that parallel, asymmetric grooves positioned along the cylindrical enclosure are particularly able to reduce direct thermal radiation heat transfer to the heat rejection end of the AMTEC cell. Cylindrical wall heat shields 11 have been found to reduce conduction heat transfer through the cylindrical wall to the heat rejection surface (condenser 7) for an adiabatic exterior wall. Therefore, an asymmetrically grooved cylindrical wall heat shield 11 should result in a significant reduction in parasitic heat transfer by reducing the heat conduction and the thermal radiation to the heat rejection surface, which therefore increases AMTEC thermal efficiency.

Figure 5:
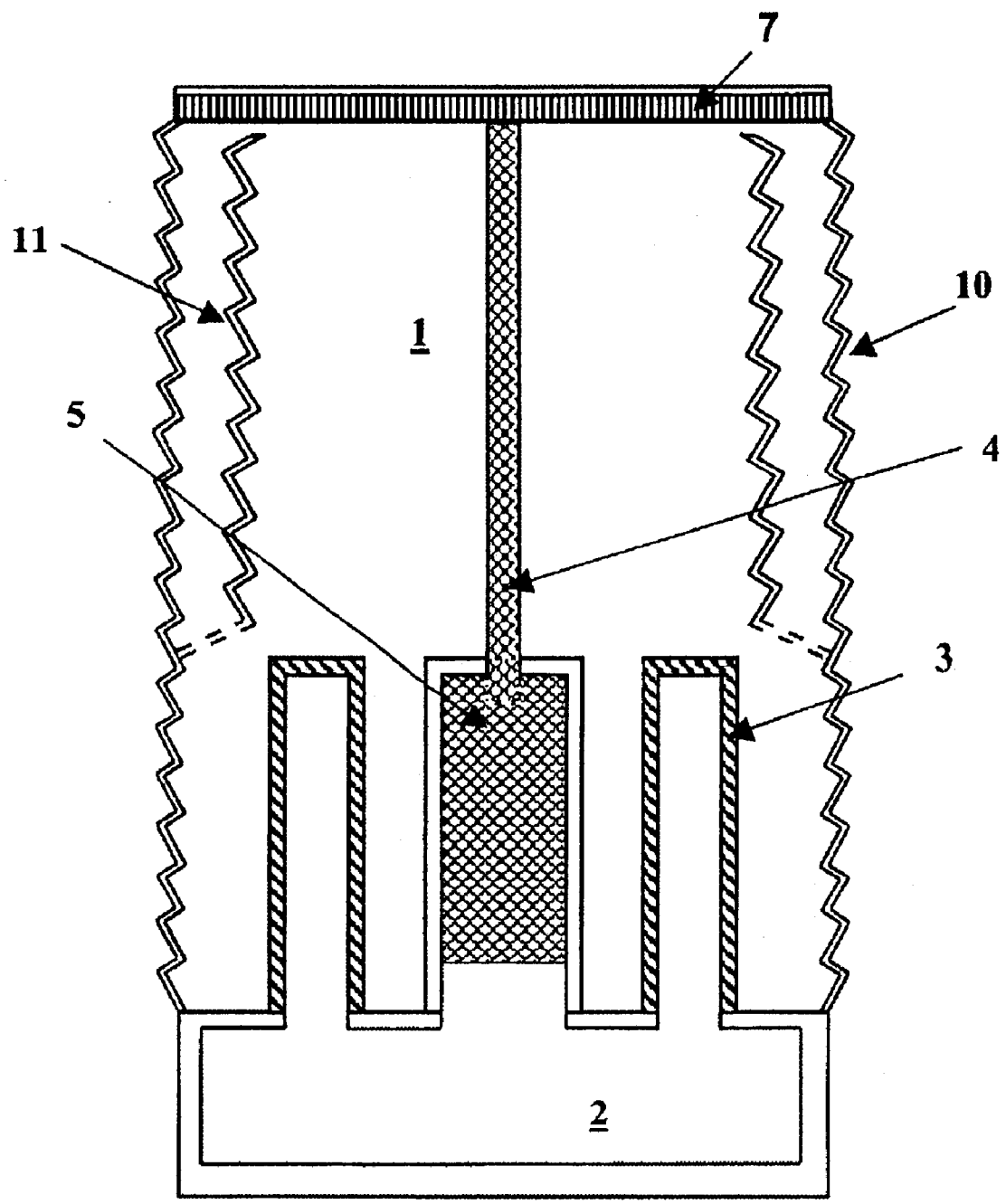
FIG. 5 is a cross-sectional view of an AMTEC cell with both an outer grooved wall and an internal grooved shield.

A third embodiment of this invention combines the first and second embodiments (see FIG. 5). In this embodiment, both the exterior wall 10 and the interior cylindrical heat shield 11 possess the asymmetric groove profile. This design increases the cylindrical wall conduction path length from the heat input region to the heat rejection region and reduces thermal radiation heat transfer to the cylindrical wall near the heat rejection surface (which is largely transferred by conduction through the cylindrical wall to the heat rejection surface). In addition, the net thermal radiation heat transfer to the heat rejection surface (condenser) is reduced.

To one skilled in the art, certain modifications that are not outside the teachings of this invention will be apparent. These modifications include, but are not limited to, variations in groove opening angles, variations in the number of grooves present in the AMTEC enclosure, variation in the groove location within the AMTEC enclosure, and variations in the groove geometry itself. Although specific preferred embodiments were presented for a specific AMTEC cell configuration, they are not intended to limit the scope of this invention. The shape of the low-pressure cavity enclosure of an AMTEC cell could vary considerably from the cylindrical shape discussed here. The asymmetric grooved wall and/or interior grooved heat shield would, in these instances, correspond to the particular shape used. It is important that the grooved surfaces be highly specular and that a significant portion of the radiation emanating from the high temperature end into the low temperature zone be reflected back onto its source.

I claim:

1. An alkali metal thermal to electric conversion (AMTEC) cell employing an alkali metal flowing between a high-temperature end of the cell and a low-temperature end of the cell through a β-alumina solid electrolyte (BASE) structure that separates the cell into a low-pressure zone and a high pressure zone, the volume of the low-pressure zone being enclosed by a wall having an interior and exterior surface, a condenser, and a BASE structure, wherein the improvement is comprised of:

said interior wall surface of said low-pressure zone being comprised of a plurality of asymmetrical grooves of high specularity, each having a first and a second surface, said first surface being aligned in opposition to said high-temperature end of said cell and said second surface being aligned in opposition to said low-temperature end, whereby radiant energy from said high-temperature end is reflected back to said high-temperature end, reducing the parasitic heat transfer from said high-temperature end to said low-temperature end.

2. The AMTEC cell of claim 1, wherein said plurality of asymmetrical grooves encompass both the interior and exterior sides of said wall, thereby increasing the wall heat conduction path from the high-temperature end to the low-temperature end of the cell.

3. The AMTEC cell of claim 2, wherein a specular heat shield comprised of an asymmetrically grooved surface essentially identical to said wall is located within said low-pressure zone and parallel to said wall.

4. An alkali metal thermal to electric conversion (AMTEC) cell employing an alkali metal flowing between a high-temperature end of the cell and a low-temperature end of the cell through a β-alumina solid electrolyte (BASE) structure that separates the cell into a low-pressure zone and a high-pressure zone, the volume of the low-pressure zone being enclosed by a wall having an interior and exterior surface, a condenser, and a BASE structure, wherein the improvement is comprised of:

a specular heat shield located within said low-pressure zone and parallel to said wall and comprised of a plurality of asymmetrical grooves of high specularity, each having a first and a second surface, said first surface being aligned in opposition to said high-temperature end of said cell and said second surface being a aligned in opposition to said low-temperature end, whereby radiant energy from said high-temperature end is reflected back to said high-temperature end.

* * * * *